United States Patent [19]
Sterzel

[11] Patent Number: 5,998,317
[45] Date of Patent: Dec. 7, 1999

[54] OPEN-CELLED POROUS SINTERED PRODUCTS AND THEIR PRODUCTION

[75] Inventor: Hans-Josef Sterzel, Dannstadt-Schauernheim, Germany

[73] Assignee: BASF Aktiengesellschaft, Ludwigshafen, Germany

[21] Appl. No.: 08/972,736

[22] Filed: Nov. 18, 1997

[30] Foreign Application Priority Data

Nov. 21, 1996 [DE] Germany ............ 196 48 270

[51] Int. Cl.⁶ .................................. B29C 65/00
[52] U.S. Cl. ................. 501/80; 501/81; 501/83; 264/44
[58] Field of Search ............. 264/44, 43; 501/81, 501/83, 80

[56] References Cited

U.S. PATENT DOCUMENTS

| | | | |
|---|---|---|---|
| 3,985,846 | 10/1976 | Lundsager et al. ............ | 264/44 |
| 4,443,262 | 4/1984 | Piersol et al. ............... | 106/209 |
| 4,629,464 | 12/1986 | Takata ....................... | 623/16 |

FOREIGN PATENT DOCUMENTS

| | | |
|---|---|---|
| 009 940 | 4/1980 | European Pat. Off. . |
| 009940 | 4/1980 | European Pat. Off. . |
| 157 974 | 10/1985 | European Pat. Off. . |
| 261 070 | 3/1988 | European Pat. Off. . |
| 261070 | 3/1988 | European Pat. Off. . |
| 404943 | 12/1988 | European Pat. Off. . |
| 330 963 | 9/1989 | European Pat. Off. . |
| 4135441 | 10/1991 | Germany . |
| 1199534 | 7/1970 | United Kingdom . |
| 2 237 014 | 4/1991 | United Kingdom . |
| 89/05285 | 6/1989 | WIPO . |
| 95/11752 | 5/1995 | WIPO . |

*Primary Examiner*—Paul Marcantoni
*Attorney, Agent, or Firm*—Keil & Weinkauf

[57] ABSTRACT

The production of open-celled porous inorganic sintered products comprises the steps a) introducing a flowable mixture comprising an aqueous polymer dispersion, sinterable inorganic powder and dispersant into a precipitation bath in which the polymer precipitates or coagulates to form a non-flowable product comprising polymer, inorganic powder and dispersant, b) removing the product from the precipitation bath and drying the product, c) heating the product to remove polymer and dispersant and sintering the product.

The porous open-celled sintered products comprising sintered inorganic powder have a pore volume of from 50 to 95%, a surface area of from 0.1 to 50 $m^2/g$ and an at least bimodal pore size distribution having maxima in the ranges from 0.02 to 5 $\mu$m and from 20 to 500 $\mu$m.

8 Claims, No Drawings

OPEN-CELLED POROUS SINTERED PRODUCTS AND THEIR PRODUCTION

The present invention relates to open-celled porous sintered products comprising ceramic or metallic materials, a process for producing them and their use.

Processes for producing open-celled porous granules by crushing inorganic foams are known.

However, these processes have serious disadvantages and are very costly, so that they have hitherto only been used in special cases. The most widespread process is infiltration of open-celled polymer foams with a slip comprising inorganic particles. The infiltrated polymer foam, usually a polyurethane foam, is carefully dried and, by prolonged, controlled heating, the organic constituents are removed and the negative consisting of inorganic powder is sintered. Both the drying of the pore structure filled with the slip and the pyrolysis of the organic constituents are very time-consuming and costly. In addition, the material thicknesses are restricted to a few centimeters because of the slow drying and pyrolysis. The production of such foams is described, for example, in DE-A-39 34 496 and EP-A-0 157 974. EP-A-0 440 322 describes a technology in which open-celled ceramic foams are produced by means of an arrangement of rollers for infiltrating polymer foams and compressing the infiltrated foams. The inorganic foams thus produced are used, for example, as supports for catalysts, eg. for flue gas treatment, as motor vehicle exhaust catalyst or diesel exhaust filter, and also as filters for purifying hot melts such as metal melts or for the filtration of hot gases. Materials employed are, for example, lithium aluminum silicate or cordierite, alpha-aluminum oxide, silicon carbide or $SiO_2$. Silicon nitride and zirconium oxide/aluminum oxide mixed ceramics have also been used.

WO 95/11752 describes a process in which metals are chemically deposited on an open-celled polymer foam and drying and pyrolysis gives an open-celled metal foam which can be converted into a ceramic foam by oxidation. Here too, drying and pyrolysis are very costly.

EP-A-0 344 284 describes the production of inorganic foams by mixing strongly alkaline alkali metal silicates or alkali metal aluminates with a powder of a base metal, preferably aluminum, with the metal dissolving and hydrogen being evolved as blowing gas. After drying the foams, these are treated with ammonium compounds to remove alkali metal ions which have an adverse effect.

EP-A 0 330 963 describes a process for producing ceramic foams in which aqueous ceramic slips are admixed with aqueous polymer dispersions, the mixture is beaten to a foam which occupies 1.5–10 times the initial volume, the foam is allowed to run into a mold, dried, the organic auxiliaries are pyrolized out and the material is then sintered. This procedure results in relatively large air bubbles also being beaten into the foam. In addition, a large part of the foam cells is closed.

It is an object of the present invention to provide a process for producing open-celled porous inorganic sintered products which can be carried out inexpensively and avoids the disadvantages of the existing processes. The sintered products thus produced should preferably have at least bimodal pore size distributions and contiguous channels which run all through the product.

We have found that this object is achieved by a process for producing open-celled porous inorganic sintered products by a) introducing a flowable mixture comprising an aqueous polymer dispersion, sinterable inorganic powder and dispersant into a precipitation bath in which the polymer precipitates or coagulates to form a non-flowable product comprising polymer, inorganic powder and dispersant, b) removing the product from the precipitation bath and drying the product, c) heating the product to remove polymer and dispersant and sintering the product.

The sintered products or granules produced by this process are open-celled, have a preferably bimodal cell size distribution having narrow maxima and a proportion by volume of pores of 50–95%. They display high mechanical stability and, even in the green state before sintering, are often porous whereby slow, time-consuming pyrolysis of the organic auxiliaries can be avoided. The process of the present invention thus makes it possible to produce open-celled porous sintered products quickly and inexpensively.

In the process of the present invention, a flowable mixture comprising an aqueous polymer dispersion, sinterable inorganic powder and dispersant is first prepared.

As polymer dispersion, it is possible to use any suitable dispersion which on introduction into the precipitation bath described below leads to precipitation or coagulation of the polymer.

The polymer in the polymer dispersion used can be any polymer obtainable by free-radical polymerization. In general, it will be a polymer obtained by emulsion polymerization. However, it is similarly possible to use polymers which are obtainable by a different method of polymerization, for example by suspension polymerization. The polymer is preferably used in the form of a dispersion which has, in particular, a polymer content in the range from 40 to 80% by weight, especially from 50 to 75% by weight. This can be a primary dispersion, ie. a dispersion as is obtained in emulsion polymerization, or a secondary dispersion, ie. a dispersion which has been obtained by subsequent dispersion of a previously isolated polymer in the dispersion medium.

The dispersion medium is generally water. However, water-miscible organic solvents such as alcohols and ketones, for example methanol, ethanol, n-propanol, isopropanol, n-butanol, acetone or methyl ethyl ketone, can also be present. The polymers are preferably prepared by free-radical polymerization of $\alpha,\beta$-ethylenically unsaturated monomers.

Suitable monomers are, for example:

$\alpha,\beta$-ethylenically unsaturated monocarboxylic and dicarboxylic acids, in particular those having from 3 to 6 carbon atoms; vinyl-aromatic compounds such as styrene, $\alpha$-methylstyrene and vinyltoluenes; linear 1-olefins, branched 1-olefins or cyclic olefins; butadiene, vinyl and allyl alkyl ethers having from 1 to 40 carbon atoms in the alkyl radical, where the alkyl radical may also bear further substituents such as a hydroxyl group, an amino or dialkylamino group or one or more alkoxylate groups; acrylamides and alkyl-substituted acrylamides; sulfo-containing monomers; $C_1$–$C_8$-alkyl esters or $C_1$–$C_4$-hydroxyalkyl esters of $C_3$–$C_6$-monocarboxylic or dicarboxylic acids (see above), in particular acrylic acid, methacrylic acid or maleic acid; alkylaminoalkyl (meth)acrylate or alkylaminoalkyl (meth) acrylamides.

Preferred monomers are the abovementioned esters of acrylic acid and methacrylic acid, the vinyl-aromatic compounds, butadiene, vinyl esters, (meth)acrylonitrile and the abovementioned (meth)acrylamides. Particular preference is given to polymers based on styrene-butadiene copolymers and acrylates. The polymer can also be a rubber.

When aqueous emulsion polymerization is used, polymers having a weight average molecular weight of from 1000 to 2,000,000, preferably from 5000 to 500,000, are obtained. The K values are generally in the range from 15 to 150 (1% strength by weight in dimethylformamide). The mean particle size (determined by means of light scattering (Autosizer)) is in the range from 20 to 1000 nm, preferably from 30 to 700 nm, particularly preferably from 40 to 400 nm. The dispersion can have a monomodal or polymodal particle size distribution.

The polymer also serves as binder for the mechanical strengthening of the precipitated or coagulated product.

The concentration of the polymer in the dispersion is preferably 1–80% by weight, particularly preferably 20–75% by weight, based on the dispersion. Based on the flowable mixture, the concentration is preferably 1–50% by weight, particularly preferably 2–30% by weight, in particular 4–20% by weight.

As aqueous medium of the mixture or the dispersion, any suitable water-containing medium can be used. For example, water can be employed as medium. Furthermore, a mixture of water with a water-soluble organic auxiliary such as a lower alcohol, eg. ethanol or isopropanol, can be used. When water is used as sole medium for preparing the flowable mixture, a work-up of organic solvents can be omitted. In addition, the precipitation or coagulation of the polymer dispersion proceeds very quickly in an aqueous medium, for example in comparison with the precipitation of water-soluble polymers in an organic solvent. Preference is thus given to using water. As a result of the precipitation or coagulation, the aqueous polymer dispersion effects the phase change from a flowable mixture to a non-flowable product comprising polymer, inorganic powder and dispersant.

Inorganic powder materials which are particularly suitable as sinterable inorganic powder for building up the open-celled, porous inorganic sintered product, in particular for building up web structures therein, are metal powders, in particular metal powders stable toward dilute acid, mineral powders, ceramic powders, metal carbide powders and metal nitride powders.

For example, ceramic materials can be used. Preference is given to the group consisting of aluminum oxide, zirconium oxide which is partially or fully stabilized with magnesium oxide or yttrium oxide, steatite, cordierite, zirconium silicate, silicon carbide, silicon nitride including known sintering aids such as aluminum oxide and yttrium oxide, mullite, tungsten carbide, titanium carbide, tantalum carbide, vanadium carbide, titanium nitride, tantalum nitride. Metal powders can likewise be used. They are preferably selected from the group consisting of copper, silver, titanium, steel and alloys based on iron, nickel or cobalt. It is also possible to use mixtures of the powders, for example ceramic powders having contents of other materials, for example metals. The mixtures can also be restricted to the groups consisting of ceramic powders and of metal powders. Carbides, nitrides or metal powders can likewise be mixed among one another and with one another.

The mean particle sizes of the ceramic powders preferably used are preferably 0.1–10 $\mu$m, particularly preferably 0.3–2 $\mu$m. The particle sizes of the metal powders are preferably 1–50 $\mu$m, particularly preferably 2–20 $\mu$m.

The amount of inorganic powder based on the flowable mixture is preferably 10–95% by weight, particularly preferably 25–85% by weight, in particular 40–85% by weight.

The dispersant used can be any suitable dispersant. For example, ionic or steric dispersants can be used. Suitable ionic dispersants are ammonia, ammonium salts of an organic or inorganic acid, and also tetraalkylammonium salts of fatty acids. Ammonium salts of organic or inorganic acids are preferably low molecular weight compounds, for example tetraalkylammonium salts of fatty acids having preferably $C_8$–$C_{20}$-alkyl radicals. Particular preference is given to tetramethylammonium salts, tetraethylammonium salts, tetrapropylammonium salts and tetrabutylammonium salts and also the mixed salts. Fatty acids which can be used here are any suitable fatty acids, for example oleic acid, linoleic acid, linolenic acid, ricinoleic acid, lauric acid, myristic acid, palmitic acid or stearic acid. The sterically acting dispersants have a surfactant structure. The dispersants lower the viscosity of the flowable mixture and thus make possible an advantageously high solids content while the mixture still remains flowable. To disperse ceramic powders, preference is given to using 0.5–3% by weight, based on the ceramic powder. For dispersing the metal powders, preference is given to using 0.01–0.5% by weight, based on the weight of the metal powder.

The mixtures used according to the present invention can consist of the abovementioned components aqueous polymer dispersion, sinterable inorganic powder and dispersant. However, they can also contain further constituents, preferably in small amounts, for example metal or noble metal ions or these metals. Examples of suitable ions are those of the elements Al, B, Ge, groups IIIa, IIb, IVb, Vb, VIb of the Periodic Table of the Elements, Be, Sn, Pb, Bi, Cu, Fe, Co, Ni, Ce, Mn or mixtures thereof. In addition, pigments or other materials which are to be present in the sintered product can be introduced into the mixture.

The flowable mixtures used according to the present invention preferably contain 10–80 parts by volume, particularly preferably 20–50 parts by volume, of inorganic powder including sintering aid, preferably 15–70 parts by volume, particularly preferably 30–60 parts by volume, of water, preferably 3–10 parts by volume, particularly preferably 3–7 parts by volume, of dispersant and preferably 3–40 parts by volume, particularly preferably 5–30 parts by volume, of polymer. The parts by volume can be % by volume, with the total amount adding up to 100% by volume.

The flowable mixtures used can be prepared by conventional methods. For example, the preparation can be carried out in conventional mixers. Setting of the appropriate viscosity is carried out, for example, by eye. In this procedure, polymer dispersion, sinterable inorganic powder, dispersant and water are mixed in such ratios that the preparation remains flowable under its own weight or can be extruded. The proportion by volume of sinterable powder at which the flow limit is reached depends on the powder particle size and the powder surface area. For example, in the case of the ceramic powders which have a relatively small particle size of 0.3–2 $\mu$m, the flow limit is reached at about 20–40% by volume. In the case of the coarser metal powders which have a mean particle diameter of 2–20 $\mu$m, the flow limit is reached, for example, at 30–50% by volume.

The flowable mixture is introduced into a precipitation bath in which the polymer precipitates or coagulates. The precipitation bath used can be any suitable bath in which the polymer dispersion used precipitates or coagulates. The precipitation bath is preferably an aqueous acid bath or an aqueous salt bath. Preference is given to using 1–50% strength by weight formic acid as acid precipitation bath.

The introduction of the flowable mixture into the precipitation bath can be carried out in a variety of ways depending on the form of the desired precipitation product. For example, the flowable mixture can be introduced in droplet form into the precipitation bath. In this procedure, the flowable mixture is allowed to run from a reservoir into a gently stirred precipitation bath in such a way that the mixture after running out from the reservoir separates into individual droplets and these droplets are precipitated in the precipitation bath to give solid droplets. Here, the mixture leaving the reservoir in the form of a stream can break up into droplets without further intervention. The break-up of the stream into droplets can also be controlled. For this purpose, the stream of the flowable mixture leaving a nozzle can be subjected to periodic vibration which forms regular constrictions. At a suitable combination of stream diameter, frequency of the vibration and flow velocity, the amplitude of the constriction is amplified by surface forces so that the stream breaks up into individual droplets having about the same diameter. Such a process is, for example, described in detail in DE-A-2 520 220 and EP-A-0 274 098. Suitable parameters for producing droplets can be determined by appropriate trials.

The flowable mixture can also be introduced or extruded into the precipitation bath in the form of extrudates. This enables extrudate-shaped precipitation products to be obtained. For producing extrudates, the mixture preferably contains 5–10% by volume more powder than in the case of the production of droplets.

Open-celled porous inorganic precipitation products are formed in the precipitation or coagulation. They preferably contain contiguous channels which run all through the product.

The non-flowable product comprises polymer, inorganic powder and dispersant. It preferably consists of these components and the medium used, in particular water. After the precipitation or coagulation, the product is, in stage b), separated off from the precipitation bath and dried. Drying is preferably carried out for 1–2 hours in a stream of air at from 100 to 130° C.

In the subsequent stage c), the product is heated to remove polymer and dispersant and simultaneously or subsequently sintered. The products are preferably heated at a rate of 2–5° C./min to such a temperature that they do not yet shrink due to sintering or shrink by at most 5% due to sintering. In the case of ceramic powders, this procedure is preferably carried out in air. The temperatures are preferably 700–1200° C. Aluminum oxide and silicon carbide are heated, for example, to 800–1100° C. Metal powders are heated to 500–1200° C. under an inert gas atmosphere, for example under nitrogen or argon, or preferably under hydrogen or gas mixtures comprising hydrogen and nitrogen and/or argon. Products comprising carbonyl iron powders having powder particle sizes of 2–5 $\mu$m reach high strengths at temperatures as low as 500° C. The temperature is preferably held for 1–4 hours at the optimum strengthening temperature and the product is then allowed to cool.

The present invention also provides the porous inorganic sintered products obtainable or obtained by the above process. These porous open-celled sintered products comprising sintered inorganic powder preferably have a pore volume of 50–95%, preferably 50–80%, a surface area of 0.1–50 m$^2$/g, preferably 1–20 m$^2$/g. The pores are irregular. The pore size distribution is preferably at least bimodal having maxima in the range 0.02–1 $\mu$m, particularly preferably 0.05–0.5 $\mu$m, and in the range 20–500 $\mu$m, preferably 20–200 $\mu$m. The porous products preferably have sintered webs having an irregular length with length differences of from 1:1.5 to 1:100, a ratio of part web diameter to particle diameter of the powder of 2–1000, preferably 5–500. The products here have a system of contiguous channels which run all through the products. These channels, also known as transport channels, preferably have a width of 20–500 $\mu$m.

The sintered products of the present invention can comprise catalytically active materials or their precursors. These materials are, for example, the above-described metals, in particular noble metals, for example platinum, palladium, cobalt, nickel, silver, iron or copper. These catalytically active materials or their precursors can be introduced into the flowable mixture or applied to the surfaces of the sintered products. The sintered products preferably contain 0.1–5% by weight, based on the total weight of the sintered product, of introduced catalytically active materials or their precursors.

These metals can, for example, be introduced as oxide powder into the flowable mixture. After drying and pyrolyzing, sintering can then be carried out under hydrogen in a reducing atmosphere. This gives sintered products which comprise catalytically active metals. The sintered products of the present invention, which are also known as sintered foam products, can be used as catalyst supports or catalysts. In addition, they can be used, for example, as column packing in separation processes in the chemical industry.

The invention is illustrated below by means of examples.

EXAMPLES 1–3

Aluminum oxide

Firstly, the amounts indicated in the table below of tetramethylammonium oleate (TMAO) in the form of a 25% strength by weight aqueous preparation as dispersant and the indicated amount of deionized water were placed in a make-up vessel and were mixed at room temperature. The indicated amount of an acrylic ester dispersion (Acronal® S 360 D from BASF AG, Ludwigshafen) as binder was then mixed in. Finally, the indicated amount of aluminum oxide (CT 3000 SG from Alcoa, mean particle size about 0.9 $\mu$m) was then stirred in over a period of 15 minutes.

The mixture thus obtained was then run dropwise at room temperature via an outlet having an adjustable valve without application of additional vibration into a moderately stirred precipitation bath consisting of 20% by weight of formic acid and 80% of deionized water. The precipitation bath contained about 10 liters of the precipitation solution in a plastic vessel.

After the mixture had been added dropwise, the precipitation bath was separated from the solidified droplet-shaped products obtained by means of a wide-mesh plastic sieve.

These products or granules which had a size of 3–6 mm were first left for 2 hours at room temperature and then heated to 120° C. in air over a period of 2 hours in a drying oven and left for 3 hours at 120° C. The drying oven was then allowed to cool, the granules were taken out and transferred to a sintering furnace. There they were, likewise in air, heated at 3° C./min from 120° C. to 800° C., left for 2 hours at 800° C. and the sintering furnace was then switched off.

The sintered granules had not shrunk in their linear dimensions compared with the dried, unsintered granules. They were mechanically stable and contained open pores having pore widths of from 0.07 to 0.2 mm.

On immersion in a stirred suspension of black copper oxide powder, the granules immediately became homogeneously black, which shows that the pore system of the granules runs uniformly and contiguously through the granules.

Composition of the flowable mixtures used

| Example | 1 | 2 | 3 |
|---|---|---|---|
| Dispersant (without water content) | | | |
| Amount [g] | 4 | 8 | 4 |
| Proportion by volume [%] | 0.9 | 1.5 | 0.9 |
| Water | | | |
| Amount [g] | 212 | 274 | 237 |
| Proportion by volume [%] | 49.8 | 52.7 | 52.3 |
| $Al_2O_3$ powder | | | |
| Amount [g] | 438 | 750 | 548 |
| Proportion by volume [%] | 25.8 | 36.2 | 30.2 |
| Binder (without water content) | | | |
| Amount [g] | 100 | 50 | 75 |
| Proportion by volume [%] | 23.5 | 9.6 | 16.6 |

The calcined products were examined in respect of their specific surface area and the pore size distribution. In the products from Examples 1 to 3, the specific surface area was from 6.1 to 6.4 m²/g. Bimodal pore size distributions were found: no micropores, no pores <0.07 μm, but intermediate-sized pores in the range around 0.2 μm in a very narrow distribution, ie. no pores >0.4 μm, plus large open pores (transport channels) in the range from 10 μm to 200 μm.

EXAMPLE 4

Silicon Carbide

Using a method similar to that of Examples 1 to 3, 12 g of a 25% strength by weight aqueous tetramethylammonium oleate preparation were dissolved in 63 g of deionized water and 100 g of the 50% strength by weight acrylic ester dispersion were introduced. 220 g of silicon carbide powder Carbogran® UF 15 (from Lonza) having a mean particle size of about 0.6 μm were then stirred in over a period of 20 minutes. This mixture was then run dropwise at room temperature into the precipitation bath as described in Example 1. After decanting off the precipitated products, these were dried at 130° C. for about 3 hours in a convection drying oven and then heated at 5° C./min to 1100° C. under nitrogen in a pyrolysis furnace and left for 2 hours at 1100° C. The granules thus obtained were mechanically very stable. They had a specific surface area of 15 m²/g and a bimodal pore size distribution having two peaks at from 0.08 to 0.3 μm and from 20 to 200 μm.

EXAMPLE 5

Steatite

A moist filter cake of a finished steatite mix was used. The figures given below are based on the solids content of the steatite. 100 g of the 50% strength aqueous acrylic ester dispersion were added to 55 g of deionized water and 12 g of a 25% strength aqueous preparation of tetramethylammonium oleate, and 234 g of steatite were dispersed a little at a time in this mixture over a period of 15 minutes.

The flowable mixture was converted into droplets as described in Example 1, the droplets were dried and then heated at a rate of 2° C./min to 900° C. and left at 900° C. for 2 hours. The droplet-shaped granules had a specific surface area of 9 m²/g. They had a bimodal particle size distribution having narrow peaks at from 0.5 to 5 μm and from 100 to 200 μm.

EXAMPLE 6

Iron 1300 g of an iron oxide pigment (Bayferrox® 22 FM from Bayer AG) having a mean particle diameter of about 0.7 μm were dispersed in a mixture of 32 g of 25% strength aqueous tetramethylammonium oleate, 80 g of deionized water and 200 g of a 50% strength by weight acrylic ester dispersion (Acronal® S 360 D from BASF AG). The mixture thus obtained was run dropwise into a 10% strength aqueous formic acid solution in which the droplets were immediately solidified. The droplet-shaped granules were decanted off and dried for 5 hours at 130° C. in a convection drying oven.

They were then transferred to a tube furnace and heated at 2° C./min to 480° C. in a stream of hydrogen, left at this temperature for one hour and then cooled. Porous iron granules having a BET surface area of 14 m²/g were obtained. The pore size distribution had two narrow maxima at 0.3 μm and 200 μm.

We claim:

1. A process for producing open-celled porous inorganic sintered products by
    a) introducing a flowable mixture comprising an aqueous polymer dispersion, sinterable inorganic powder and dispersant into a precipitation bath in which the polymer precipitates or coagulates to form a non-flowable product comprising polymer, inorganic powder and dispersant,
    b) removing the product from the precipitation bath and drying the product,
    c) heating the product to remove polymer and dispersant and sintering the product.

2. A process as claimed in claim 1, wherein, in stage a), the mixture is introduced in droplet form or extrudate form.

3. A process as claimed in claim 1, wherein the sinterable inorganic powder is selected from the group consisting of metal powders, mineral powders, ceramic powders, and mixtures thereof.

4. A process as claimed in claim 1, wherein the precipitation bath is an aqueous acid bath or salt bath.

5. A process as claimed in claim 1, wherein the dispersant is ammonia, an ammonium salt of an organic or inorganic acid or a tetraalkyl-ammonium salt of a fatty acid.

6. A process as claimed in claim 1, wherein the polymer in the polymer dispersion is based on styrene-butadiene copolymers or $C_1$–$C_6$-alkyl (meth)acrylates.

7. A process as claimed in claim 1, wherein catalytically active materials or their precursors are introduced into the flowable mixture or applied to the surfaces of the sintered products.

8. A process as claimed in claim 3, wherein the sinterable inorganic powder is a ceramic powder selected from the group consisting of a metal carbide, a metal nitride, and mixtures thereof.

* * * * *